United States Patent Office 3,006,956  
Patented Oct. 31, 1961

3,006,956  
PROCESS FOR THE PRODUCTION AND PURIFICATION OF DIMETHYLACYLAMIDES  
Arthur W. Campbell, Terre Haute, Ind., assignor to Commercial Solvents Corporation, Terre Haute, Ind., a corporation of Maryland  
No Drawing. Filed Dec. 30, 1957, Ser. No. 705,796  
7 Claims. (Cl. 260—561)

My invention relates to a process for the production and purification of dimethylacylamides and more particularly to a process for the production of substantially pure dimethylacylamides by reacting dimethylamine with a lower aliphatic acid at elevated temperatures and pressures.

Dimethylacylamides have previously been prepared by reacting stoichiometrically equal portions of dimethylamine and lower aliphatic acids in a scrubber and introducing the resulting reaction mixture into a reactor containing a mixture of dimethylacetamide and acetic acid, the acetic acid being present in less than the azeotropic normal ratio of 21%, and thereafter condensing and subjecting the crude product to distillation in a packed column to obtain a relatively pure dimethylacylamide.

I have now discovered a more simple and economical process for the production of substantially pure dimethylacylamides which does not require the multiplicity of reactors, scrubbers, distilling towers, and condensers previously commonly required for the production of substantially pure dimethylacylamides. My new process consists essentially of reacting a substantial excess of dimethylamine with a lower aliphatic acid, such as formic, acetic, propionic or butyric acid, under conditions of elevated temperature and pressure whereby a reduced amount of azeotrope is formed, and recovering the dimethylacylamide from the azeotrope by distillation. Recovery is effected relatively easily by using my new process, as the usual portions of azeotropes are never formed. In the production of dimethylformamide azeotropes are seldom or never formed. In the production of the latter, however, by my new process improved yields of the desired product are formed, as is likewise the case with the other lower dimethylacylamides produced by my new and improved process.

The process of my invention is carried out at temperatures ranging from about 190° C. to about 400° C. I have found that optimum temperatures for production of dimethylacetamide and propionamide are from about 250 to 325° C., and that the optimum temperature for preparing dimethylbutyramide is about 270 to 350° C.

Pressures in excess of about 900 p.s.i. are required in my process. I prefer to utilize pressures of about 1000 to 1200 p.s.i. in my process as I obtain at these pressures both excellent yields of the desired dimethylacylamides and reduced amounts of the azeotropes which increase the difficulty of recovering substantially pure dimethylacylamides.

In addition to high temperatures and pressures I have found out that it is necessary to maintain an excess of dimethylamine in the reaction system in order to reduce the formation of the undesired azeotropes.

I have found that molar ratios in excess of 1.2:1 are operative in my process. I prefer, however, to use molar ratios of dimethylamine to lower aliphatic acid of about 1.4:1 to 1.6:1 as I have found that I obtain good yields of the dimethylacylamide with reduced amounts of azeotropes, and only have small amounts of dimethylamine to recycle at these ratios.

My process can be satisfactorily operated either as a batch operation in sealed bomb reactors, or as a continuous operation in which the reactor is maintained at the desired pressure and temperature, the reactants being continuously introduced into the reactor in the required ratio.

The following examples further illustrate my invention but it is not intended that my invention be limited to the amounts, proportions, or procedures described therein, but rather I mean to include all equivalents obvious to those skilled in the art within the scope of my invention.

*Example I*

In a run made to determine the amounts of complex formed in the process of my invention, 9 moles of dimethylamine were reacted with 6.6 moles of acetic acid in a pressure bomb at 300° C. and 1025 p.s.i. for four hours. After completion of the reaction, the bomb was cooled and excess dimethylamine vented. Using a 24-bulb jacketed Snyder colum at a 5:1 reflux ratio there was obtained 440.5 grams of dimethylacetamide having a purity of 99.7%. There was also recovered 52.3 grams of dimethylacetamide-acetic acid complex and 60.4 grams of high boiling materials consisting primarily of monomethylamine acetamide.

*Example II*

In a second run carried out under the same reaction conditions using a more pure dimethylamine, 459.3 grams of dimethylacetamide containing essentially no acetic acid were recovered together with 60.1 grams of complex. An actual yield of 85% substantially pure dimethylacetamide was recovered in this reaction.

*Example III*

Dimethylbutyramide in better than 90% yield was obtained by reacting 9 moles of pure anhydrous dimethylamine with 6.5 moles of butyric acid at about 335° C. in a sealed pressure bomb. At the end of a 4.5 hour reaction period the system was cooled and vented to remove excess dimethylamine. The residue was distilled at a temperature of about 180–195° C. to remove the desired dimethylbutyramide fraction.

Now having described my invention what I claim is:

1. In a process for preparing substantially pure lower dimethylacylamides, the steps which comprise reacting dimethylamine with a lower alkanoic acid at a molar ratio of dimethylamine to lower alkanoic acid of about 1.2:1 to about 1.6:1 at temperatures ranging from 190° to 400° C., and pressures ranging from 900 p.s.i. to 1200 p.s.i. and recovering the desired dimethylacylamide in substantially pure form by distilling the resulting reaction mixture.

2. In a process for the manufacture of substantially pure lower dimethylacylamides, the steps which comprise reacting dimethylamine with a lower alkanoic acid at a molar ratio of dimethylamine to lower alkanoic acid of about 1.2:1 to about 1.6:1 at temperatures ranging from 190° to 400° C. and pressures ranging from 900 p.s.i. to 1200 p.s.i. and recovering substantially pure lower dimethylacylamide by distilling the resulting reaction mixture.

3. In a process for the production of substantially pure lower dimethylacylamides by reacting dimethylamine with a lower alkanoic acid at temperatures ranging from 190° to 400° C., the steps which comprise reacting a lower alkanoic acid with of about 1.2:1 to about 1.6:1 moles of dimethylamine at pressures in excess of about 900 p.s.i. and recovering substantially pure lower dimethylacylamide by distilling the resulting reaction mixture.

4. In a process for manufacturing a substantially pure lower dimethylacylamide, the steps which comprise reacting dimethylamine with a lower alkanoic acid at a mole ratio of dimethylamine to lower alkanoic acid of about 1.2:1 to about 1.6:1 at temperatures ranging from 270° to about 350° C. and at pressures of about 1,000 to 1,200 p.s.i. and recovering substantially pure lower dimethyacylamide by distilling the resulting reaction mixture.

5. In a process for preparing substantially pure dimethylacetamide, the step which comprises reacting dimethylamine with glacial acetic acid at a molar ratio of dimethylamine to acetic acid of about 1.2:1 to about 1.6:1, at a temperature of about 250 to about 325° C. and at a pressure of about 1,000 to 1,200 p.s.i. and recovering substantially pure dimethylacylamide by distilling the resulting reaction mixture.

6. In a process for preparing substantially pure dimethylpropionamide, the step which comprises reacting dimethylamine with propionic acid at a molar ratio of dimethylamine to propionic acid of about 1.2:1 to about 1.6:1, at a temperature of about 250 to about 325° C. and at a pressure of about 1,000 to 1,200 p.s.i. and recovering substantially pure dimethylpropionamide by distilling the resulting reaction mixture.

7. In a process for preparing substantially pure dimethylbutyramide, the step which comprises reacting dimethylamine with butyric acid at a molar ratio of about 1.2:1 to about 1.6:1, at a temperature of about 270 to about 350° C. and at a pressure of about 1,100 to 1,300 p.s.i. and recovering substantially pure dimethylbutyramide by distilling the resulting reaction mixture.

References Cited in the file of this patent

UNITED STATES PATENTS

| | | |
|---|---|---|
| 2,151,369 | Arnold et al. | Mar. 27, 1939 |
| 2,166,971 | Schmidt et al. | July 25, 1939 |

FOREIGN PATENTS

| | | |
|---|---|---|
| 719,792 | Great Britain | Dec. 8, 1954 |

OTHER REFERENCES

Ruhoff et al.: J. Amer. Chem. Soc., vol. 59 (1937), pp. 401–2.